United States Patent
Chen et al.

(10) Patent No.: US 12,452,893 B2
(45) Date of Patent: Oct. 21, 2025

(54) DATA TRANSMISSION METHOD AND DEVICE, FEEDBACK INFORMATION TRANSMISSION METHOD AND DEVICE, STORAGE MEDIUM, AND ELECTRONIC DEVICE

(71) Applicant: ZTE Corporation, Shenzhen (CN)

(72) Inventors: Yijian Chen, Shenzhen (CN); Zhaohua Lu, Shenzhen (CN); Fusheng Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 831 days.

(21) Appl. No.: 17/416,624

(22) PCT Filed: Dec. 23, 2019

(86) PCT No.: PCT/CN2019/127540
§ 371 (c)(1),
(2) Date: Jun. 21, 2021

(87) PCT Pub. No.: WO2020/125802
PCT Pub. Date: Jun. 25, 2020

(65) Prior Publication Data
US 2022/0095307 A1    Mar. 24, 2022

(30) Foreign Application Priority Data
Dec. 21, 2018    (CN) .............................. 201811573758

(51) Int. Cl.
*H04W 72/53*    (2023.01)
*H04L 1/00*    (2006.01)
(Continued)

(52) U.S. Cl.
CPC ........... *H04W 72/53* (2023.01); *H04L 1/0003* (2013.01); *H04L 5/0053* (2013.01);
(Continued)

(58) Field of Classification Search
CPC . H04W 72/53; H04W 72/0446; H04W 72/23; H04W 72/542; H04W 72/121;
(Continued)

(56) References Cited

U.S. PATENT DOCUMENTS

2018/0123767 A1    5/2018  Islam et al.
2018/0317225 A1*   11/2018 Akkarakaran ........ H04L 5/0044
(Continued)

FOREIGN PATENT DOCUMENTS

CN          105515735 A       4/2016
CN          108809484 A       11/2018
(Continued)

OTHER PUBLICATIONS

3GPP TSG RAN WG1 Meeting #93 R1-1805900 Busan, Korea, May 21-25, 2018 Agenda Item: 7.1.3.3.1, Source: Huawei, HiSilicon (Year: 2018).*

(Continued)

*Primary Examiner* — Mazda Sabouri
(74) *Attorney, Agent, or Firm* — CANTOR COLBURN LLP

(57) ABSTRACT

A data transmission method and device, a feedback information transmission method and device, a storage medium, and an electronic device are provided. The data transmission method includes that: a regulation instruction for regulating at least one predetermined aggregated slot is determined; the at least one predetermined aggregated slot is regulated according to the regulation instruction; and data is transmitted using the regulated aggregated slot.

20 Claims, 2 Drawing Sheets

(51) Int. Cl.
  *H04L 5/00* (2006.01)
  *H04W 72/0446* (2023.01)
  *H04W 72/23* (2023.01)
  *H04W 72/542* (2023.01)

(52) U.S. Cl.
  CPC ....... *H04W 72/0446* (2013.01); *H04W 72/23* (2023.01); *H04W 72/542* (2023.01)

(58) Field of Classification Search
  CPC ............ H04W 72/1273; H04L 1/0003; H04L 5/0053; H04L 5/0023; H04L 5/0055; H04L 5/0044; H04L 5/0094
  USPC ......................................................... 370/329
  See application file for complete search history.

(56) References Cited

U.S. PATENT DOCUMENTS

2019/0215831 A1* 7/2019 Baldemair ........ H04W 72/0446
2019/0327723 A1* 10/2019 Li ......................... H04L 1/1854
2019/0373607 A1* 12/2019 Zhang ................... H04W 72/23
2020/0053767 A1* 2/2020 Bai ....................... H04W 72/23

FOREIGN PATENT DOCUMENTS

CN       108811120 A        11/2018
WO       2018031623 A1      2/2018
WO       WO-2018174761 A1 *  9/2018 ........... B23B 31/261

OTHER PUBLICATIONS

International Search Report for corresponding PCT/CN2019/127540 filed Dec. 23, 2019; Mail date Mar. 27, 2020.

European Search Report for corresponding application EP19899571; Mail date Jan. 31, 2022.

LG Electronics, "Discussion on Resource allocation and TBS determination", 3GPP TSG RAN WG1 Meeting 91, Reno USA, Nov. 27-Dec. 1, 2017 R1-1719929.

NTT DOCOMO INC, DL/UL resource allocation. 3GPP TSG RAN WG1 Meeting 91 Reno USA Nov. 27-Dec. 1, 2017, R1-1720821.

European Office Action for corresponding application EP19899571; Mail date May 6, 2024.

* cited by examiner

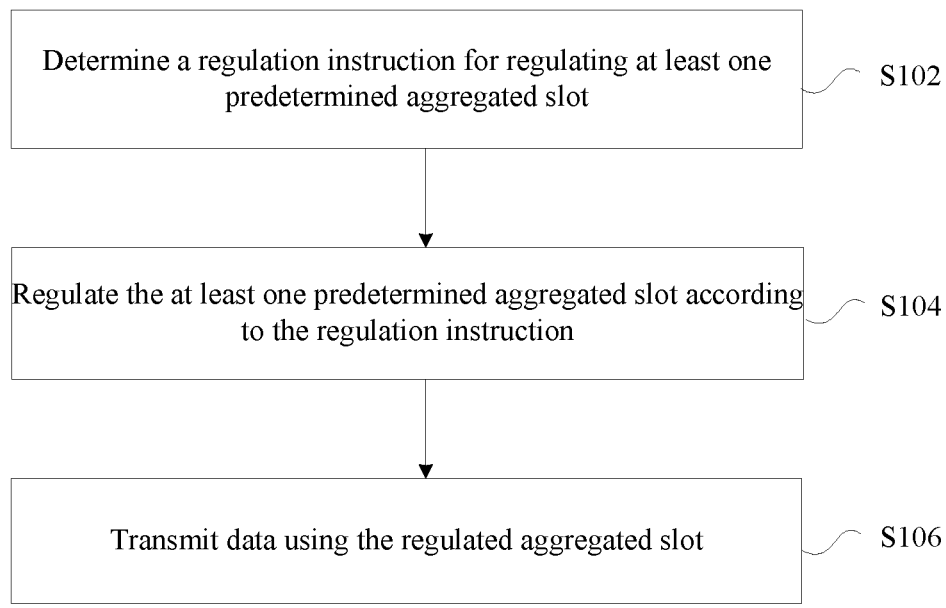
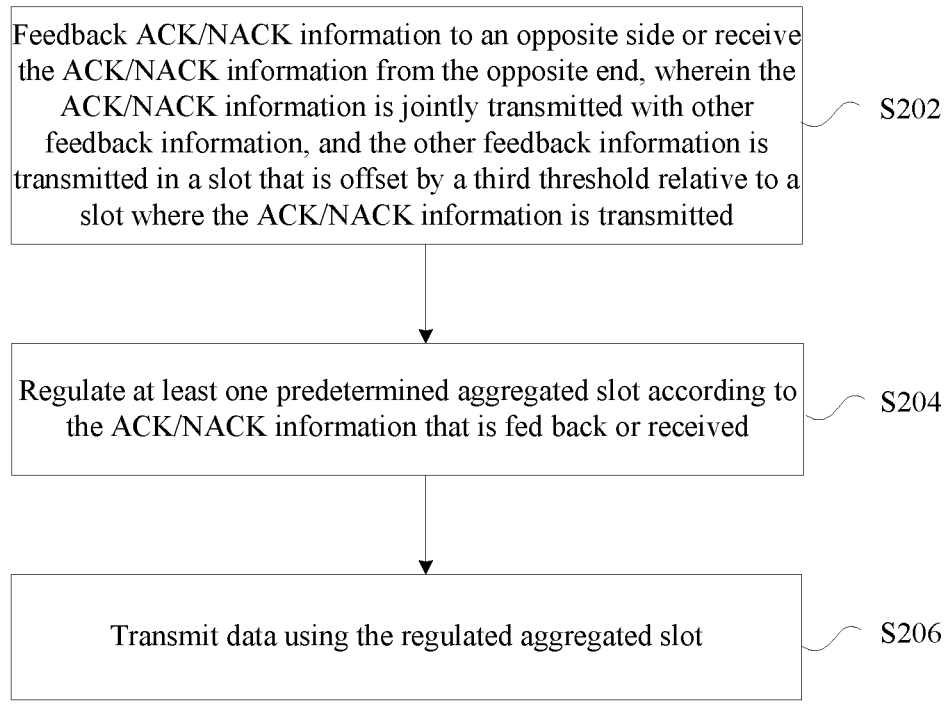

DATA TRANSMISSION METHOD AND DEVICE, FEEDBACK INFORMATION TRANSMISSION METHOD AND DEVICE, STORAGE MEDIUM, AND ELECTRONIC DEVICE

CROSS-REFERENCE TO RELATED APPLICATION

The present disclosure is a National Stage Filing of the PCT International Application No. PCT/CN2019/127540 filed on Dec. 23, 2019, which claims priority to Chinese Patent Application No. 201811573758.9, submitted to the China National Intellectual Property Administration on Dec. 21, 2018, the entire contents of which are incorporated herein by reference.

TECHNICAL FIELD

The present disclosure relates to the field of communication, and for example, to a data transmission method and device, a feedback information transmission method and device, a storage medium, and an electronic device.

BACKGROUND

Slot aggregation transmission, as an efficient transmission manner, mainly includes two types of transmission. The first type of transmission is that information transmitted in different slots corresponds to the same source data block. The second type of transmission is that information transmitted in different slots corresponds to different source data blocks.

Since slot aggregation transmission does not require control signaling to be sent in each slot where data is sent to implement independent resource scheduling and transmission parameter indication of each slot, an effect of reducing a control signaling overhead may be achieved by each type, and furthermore, the resource utilization efficiency is improved.

For reducing the control signaling overhead, a slot aggregation manner is used. For reducing influences on the transmission performance, slot aggregation may usually be applied to a scenario where a channel condition changes slowly. Here, the channel condition includes a channel response value and an interference level. Due to a relatively high redundancy, the first type of slot aggregation may also be applied to a scenario where a channel changes fast. This type of slot aggregation may bring a merging gain and a diversity gain by sending for many times, thereby improving the robustness. Multiple slots may bring the merging gain.

In a slot aggregation technology, resources and transmission parameters of each slot are the same. This manner is relatively simple. However, there may be brought the problem of a certain flexibility loss, so the transmission performance is reduced to a certain extent, compared with a non-aggregation condition. This manner does not support the use of optimal resources and optimal transmission parameters in each slot, and therefore needs improvement. In addition, the number of aggregated slots is usually fixed, so this manner is not so flexible, and the transmission efficiency may be affected.

For the problems of low data transmission flexibility and low transmission efficiency caused by the fact that aggregated slots are fixed in the related art, no effective solution has been proposed yet.

SUMMARY

Embodiments of the disclosure provide a data transmission method and device, a feedback information transmission method and device, a storage medium, and an electronic device, which may at least solve the problems of low data transmission flexibility and low transmission efficiency caused by the fact that of aggregated slots are fixed in the related art.

According to an embodiment of the present disclosure, a data transmission method is provided, which may include that: a regulation instruction for regulating at least one predetermined aggregated slot is determined; the at least one predetermined aggregated slot is regulated according to the regulation instruction; and data is transmitted using the regulated aggregated slot.

According to another embodiment of the present disclosure, a feedback information transmission method is also provided, which may include that: Acknowledgment (ACK)/Negative Acknowledgment (NACK) information is fed back to an opposite side or received from the opposite end, wherein the ACK/NACK information is jointly transmitted with other feedback information, and the other feedback information is transmitted in a slot that is offset by a third threshold relative to a slot where the ACK/NACK information is transmitted; at least one predetermined aggregated slot is regulated according to the ACK/NACK information that is fed back or received; and data is transmitted using the regulated aggregated slot.

According to another embodiment of the present disclosure, a data transmission device is also provided, which may include: a determination module, configured to determine a regulation instruction for regulating at least one predetermined aggregated slot; a first regulation module, configured to regulate the at least one predetermined aggregated slot according to the regulation instruction; and a first transmission module, configured to transmit data using the regulated aggregated slot.

According to another embodiment of the present disclosure, a feedback information transmission device is also provided, which may include: a second transmission module, configured to feed back, to an opposite end, or receive, from the opposite end, ACK/NACK information, wherein the ACK/NACK information is jointly transmitted with other feedback information, and the other feedback information is transmitted in a slot that is offset by a third threshold relative to a slot where the ACK/NACK information is transmitted; a second regulation module, configured to regulate at least one predetermined aggregated slot according to the ACK/NACK information that is fed back or received; and a third transmission module, configured to transmit data using the regulated aggregated slot.

According another embodiment of the present disclosure, a storage medium is also provided, in which a computer program may be stored, the computer program being configured to execute the operations in any abovementioned method embodiment at runtime.

According to another embodiment of the present disclosure, an electronic device is also provided, which may include a memory and a processor. A computer program may be stored in the memory. The processor may be configured to run the computer program to execute the operations in any abovementioned method embodiment.

In the embodiments of the disclosure, aggregated slots that are used are not fixed but can be flexibly regulated according to regulation instructions. That is, dynamic aggregated slots are used. Due to use of the dynamic aggregated slots, the transmission performance during data transmission can be improved effectively, the transmission efficiency can be improved, and the problems of low data transmission flexibility and low transmission efficiency caused by the fact that aggregated slots are fixed in the related art can be solved effectively.

BRIEF DESCRIPTION OF THE DRAWINGS

FIG. 1 is a flowchart of a data transmission method according to an embodiment of the disclosure;

FIG. 2 is a flowchart of a feedback information transmission method according to an embodiment of the disclosure;

DETAILED DESCRIPTION

Figure 3:
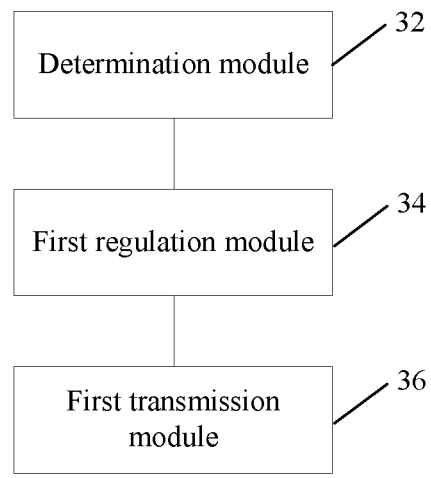
FIG. 3 is a structure block diagram of a data transmission device according to an embodiment of the disclosure.

The present disclosure will be described below with reference to the drawings and in combination with the embodiments in detail.

It is to be noted that terms "first", "second" and the like in the specification, claims and drawings of the present disclosure are adopted not to describe a specific sequence or order but to distinguish similar objects.

The relatively fixed number of aggregated slots during slot aggregation brings the problem of serious resource waste. What causes this problem is that the number of the aggregated slots is predetermined or configured. Since there is a delay for Channel State Information (CSI), and interferences during measurement may change during transmission, an estimated optimal Modulation and Coding Scheme (MCS) and aggregated slot quantity are not entirely accurate, and there may be deviations. If the number of the aggregated slots is too small, transmission may not be completed at one time, and retransmission is required, so the efficiency may be affected. If the number of the aggregated slots is too large, overhead waste is brought.

For the foregoing problem, there is proposed a solution of dynamically regulating slot aggregation in the embodiments of the disclosure. That is, an aggregation solution is not predetermined, and may be changed dynamically. The present disclosure will be described below in combination with embodiments.

An embodiment provides a data transmission method. FIG. 1 is a flowchart of a data transmission method according to an embodiment of the disclosure. As shown in FIG. 1, the flow includes the following operations.

In S102, a regulation instruction for regulating at least one predetermined aggregated slot is determined.

In S104, the at least one predetermined aggregated slot is regulated according to the regulation instruction.

In S106, data is transmitted using the regulated aggregated slot.

The operations may be executed by a terminal.

In the embodiment, aggregated slots that are used are not fixed but can be flexibly regulated according to regulation instructions. That is, dynamic aggregated slots are used. Due to use of the dynamic aggregated slots, the transmission performance during data transmission can be improved effectively, the transmission efficiency can be improved, and the problems of low data transmission flexibility and low transmission efficiency caused by the fact that aggregated slots are fixed in the related art can be solved effectively.

In an exemplary embodiment, the regulation instruction includes at least one of the following: received first Downlink Control Information (DCI) signaling; feedback information fed back to an opposite end or received from the opposite end; an instruction triggered by modifying a scheduled resource position parameter; and an instruction triggered by modifying a Transmission Configuration Indicator (TCI) (the instruction may be an instruction received by the terminal from a base station).

In an exemplary embodiment, in a case where the regulation instruction includes the first DCI signaling, the operation that the at least one predetermined aggregated slot is regulated according to the regulation instruction includes that: a slot where the first DCI signaling is received is determined as a first slot; and ending time of the at least one predetermined aggregated slot is regulated to a second slot that is offset by a first threshold relative to the first slot. In some exemplary implementations, slot aggregation sending or reception may be instructed, through DCI signaling, to be terminated in advance or suspended. The terminal may perform slot aggregation transmission from a moment t1. Here, transmission includes sending or reception.

From the moment t1, the terminal is required to send or receive data in the aggregated slot according to a predetermined slot aggregation rule before the terminal receives the DCI instruction or triggers other termination/suspension conditions. If the termination instruction triggered by DCI is not received all the time, and the number of aggregated slots is smaller than X, the terminal always understands according to the original rule that slot aggregation still does not satisfy a maximum slot number.

The maximum aggregated slot quantity X may be predetermined, X being a positive integer. A value of X may also be configured through high-layer signaling, such as Radio Resource Control (RRC) signaling. The base station may configure different X values for different terminals and set different X values for different scenarios, as required. Physical-layer signaling may also be used. The base station may send the DCI signaling when slot aggregation transmission is started, and the DCI signaling may contain value information of X. An aggregated slot quantity being equal to X means the maximum aggregated slot quantity is reached, subsequent slots are not aggregated, and new DCI is required for transmission of scheduling data. It is to be pointed out that there is such a special case that X is predetermined or configured to be infinitely great.

After the terminal receives DCI that instructs slot aggregation to be ended or instructs new scheduling to be started, for downlink reception, the terminal may end present slot aggregation transmission. Ending time may be determined according to time when the DCI is received, such as slot s where the DCI is located, or s+o1, wherein o1 is a first slot aggregation offset, and may be a positive integer, a negative integer, or 0, and o1 may be indicated by the DCI.

In an exemplary embodiment, in a case where the regulation instruction includes the first DCI signaling, the method further includes that: a slot where the first DCI signaling is received is determined as a first slot; and ACK/NACK information is fed back in a third slot that is offset by a second threshold relative to the first slot. In the embodiment, the terminal may further trigger feedback of an ACK/NACK after receiving the DCI that instructs slot aggregation to be ended, and feedback time may be s+k, wherein s is the slot where the DCI is located, k is a feedback offset, and k is a non-negative integer.

After the terminal receives the DCI that instructs slot aggregation to be suspended or terminated or instructs new scheduling to be started, for uplink sending, the terminal may end slot aggregation and stop sending data block information corresponding to present slot aggregation. Ending time may be determined according to the time when the DCI is received, such as slot s where the DCI is located, or s+o2, wherein o2 is a second slot aggregation offset, o2 may be a positive integer, a negative integer, or 0, and o2 may specifically be indicated by the DCI.

It is to be pointed out that not all received DCI has a function of instructing slot aggregation to be suspended or terminated. Some conditions may be used to instruct slot aggregation to be suspended or terminated. For example, in a case where the scheduled resource position parameter is modified or the TCI is modified, slot aggregation is triggered to be suspended or terminated.

In an exemplary embodiment, in a case where the regulation instruction includes the feedback information, the operation that the at least one predetermined aggregated slot is regulated according to the regulation instruction includes that: a slot where the feedback information is fed back or received is determined as a fourth slot; and ending time of the at least one predetermined aggregated slot is regulated to a fifth slot that is offset by a third threshold relative to the fourth slot. In the embodiment, slot aggregation sending or slot aggregation reception may be instructed, through the feedback information, to be terminated in advance or suspended. In the embodiment, a receiver (for example, the terminal) may give a feedback in a slot aggregation process. Multiple feedback manners may be specifically used, which may include periodic or aperiodic feedback or feedback at equal time intervals or unequal time intervals.

In an exemplary embodiment, the feedback information includes at least one of the following: ACK/NACK information; CSI; stopping request information requesting for stopping (including terminating or suspending) slot aggregation; beam recovery request information; transmission parameter change request information; and recommendation information for indicating a transmission format for transmission of the data. Each specific feedback manner will be described below.

(a) For the ACK/NACK Information

For example, for downlink, if the terminal feeds back the ACK that represents correct demodulation in slot s2, the terminal may stop corresponding present slot aggregation transmission in slot s2+o3. Herein, o3 may be an integer. It is to be pointed out that a value of o3 may be 0 or negative. That is, reception may have been stopped before the ACK is fed back. If the terminal feeds back the NACK that represents incorrect demodulation in slot s2, the terminal may suspend reception.

For uplink, if the terminal receives the ACK that represents correct demodulation in slot s2, the terminal may terminate or suspend present slot aggregation transmission and stop sending corresponding information. If the terminal receives the NACK that represents incorrect demodulation in slot s2, the terminal may suspend sending of a present transmission block and send a new transmission block, or may continue sending the present transmission block until receiving the ACK.

(b) For the CSI

Besides the ACK/NACK, the feedback information may also be other feedback information, such as the CSI. It may be set that a feedback state of part of CSI may trigger termination or suspension of slot aggregation.

(c) For the Other Feedback Information, Including:

termination or suspension request information: the termination or suspension request information may be feedback information sent by the terminal for requesting for terminating or suspending slot aggregation, and through the feedback, the terminal may request for terminating present slot aggregation, or request for suspending present slot aggregation;

beam recovery request information: beam recovery may trigger termination or suspension of slot aggregation, and when a beam recovery request is received, slot aggregation is terminated or suspended;

transmission parameter change request information: a transmission parameter change request, such as a transmission beam change request and an MCS change request, sent by the terminal may trigger termination or suspension of slot aggregation; and sending format recommendation information: the terminal may recommend the sending format, and discontinuous slot aggregation is used for part of sending formats, so present slot aggregation may be suspended.

After slot aggregation of the present transmission block is terminated or suspended, another transmission block may be transmitted, or transmission may be stopped.

Here, termination refers to ending the present slot aggregation transmission. Suspension refers to temporarily ending slot aggregation and determining whether to terminate or continue aggregation according to a condition.

For example, a transmission may be divided into several segments, and every time when a segment is completed, after certain waiting time, whether to continue transmission is judged after an ACK/NACK or other feedback information is received. For example, information of other terminals is usually transmitted at positions of 0 in 111100001111000011110000. ACK/NACK may be triggered in a case of switching between 1 and 0. This structure is equivalent to discrete slot aggregation. A difference of this manner from a conventional manner is that continuing transmission requires no instruction, while new transmission requires an instruction.

Another significant benefit of the dynamic slot aggregation number is that the transmission performance in case of a deviation of configuration of the MCS during data transmission can be improved significantly, thereby improving the transmission efficiency. The MCS is determined according to a Channel Quality Indication (CQI), the CQI has always been a bottleneck that affects the performance due to the accuracy problem of interference measurement, and there is a significant performance difference between transmission efficiency under an ideal MCS and transmission efficiency under an inaccurate MCS. Through the dynamic slot aggregation number, the resource utilization rate may be maximized well in a case where the terminal is insensitive to the transmission delay and the interference level changes greatly with time.

In an exemplary embodiment, the at least one predetermined aggregated slot includes at least one slot aggregation subgroup. Part of transmission parameters in the at least one slot aggregation subgroup are fixed, and other transmission parameters are variable; and/or, part of transmission parameters in the at least one slot aggregation subgroup are general transmission parameters, and other transmission parameters are specific transmission parameters, wherein the general transmission parameters in all slot aggregation subgroups in the at least one predetermined aggregated slot are the same, the specific transmission parameters are specific to each slot aggregation subgroup, and the specific transmission parameters used in each slot in a slot aggregation subgroup are the same.

In the embodiment, multiple slot subgroups may be predetermined or configured regardless of discrete slot aggregation or continuous slot aggregation. Division of the subgroups may be determined according to a slot aggregation format, or a sender instructs the subgroups to be divided through high-layer or physical-layer signaling. Each slot subgroup may include one or more slots. It is to be noted that there are some special cases that the slots in the subgroups may be intersected.

For different slot aggregation subgroups, part of transmission parameters cannot be changed, but part of transmission parameters can be changed between the subgroups.

For example, frequency-domain resource allocation to each slot aggregation subgroup is the same, but the MCS can be changed between the subgroups.

For example, the MCS of each slot aggregation subgroup is the same, but different frequency-domain resources can be changed.

For example, the MCS and allocated frequency-domain resources of each slot aggregation subgroup are the same, but the TCI can be changed between the subgroups.

For example, the MCS and allocated frequency-domain resources of each slot aggregation subgroup are the same, but the slot format can be changed between the subgroups.

In summary, the transmission parameters may be divided into two types: one type of transmission parameter is the same to all aggregated slots, and the other type of transmission parameter is the same only for the slots in the same aggregation subgroup.

The transmission parameter mentioned in the embodiment is a broad concept, and may cover various parameters related to transmission, and if these parameters cannot be acquired, transmission cannot be implemented accurately. A typical transmission parameter type includes at least one of the following: a precoding binding parameter, e.g., a frequency-domain or time-domain precoding binding granularity; a Quasi-Co-Location (QCL) relationship indication parameter, e.g., associated Reference Signal (RS) information, QCL related group information, and a QCL relationship type; a resource configuration parameter, e.g., a definition of a resource granularity, a size of an allocated resource, and a resource type; a rate matching parameter, e.g., a Zero Power Reference Signal/Resource Element (ZP RS/RE), as well as assumed occupation configurations of some other signals; an RS configuration related parameter; Demodulation Reference Signal (DMRS): a density, a sequence, a port number, a pattern, power, a multiplexing manner, an Orthogonal Convolutional Code (OCC) length, etc.; Phase Tracking Reference Signal (PTRS): a port number, a sequence, a time-frequency density, an enable parameter, a position, power, and pre-coding; a Channel State Information-Reference Signal (CSI-RS): a pattern, a density, an OCC, a sequence, power, a multiplexing manner, a numbering rule, a type, etc.; a receiving manner configuration parameter: a receiving beam/weight, and a receiving antenna; a transmission technology/mode: diversity, open-loop, semi-open-loop, and closed-loop, wherein subclasses may be subdivided; a transmission manner: single-beam transmission, multi-beam transmission, single-node/cell, multi-node/cell, single-user transmission/multiuser transmission, and single-layer transmission/multilayer transmission; a mapping/interleaving parameter: RE mapping, mapping from code stream to layer, mapping from Code Block (CB) to Code Block Group (CBG), etc.; a sending and/or receiving beam configuration parameter: a wide beam, a narrow beam, and a beam set; an MCS configuration parameter: an MCS or candidate MCS set; a codeword number/transmission layer number; a multiple access manner/resource multiplexing manner; a waveform configuration; a sending power configuration: absolute power, relative power (offset), and an object that the relative power refers to; a numerology parameter: a subcarrier spacing, a time-domain symbol length, a Cyclic Prefix (CP) length, etc.; and a Hybrid Automatic Repeat reQuest (HARQ) related parameter: a process number, a new/old data state, and a redundancy version number. The slot aggregation format, the transmission parameter of the slot subgroup, etc., may further be included. These parameters are also closely related to the correctness of transmission, and can also be understood as transmission parameters.

In an exemplary embodiment, the other transmission parameters are changed according to at least one of the following manners: changing according to a predetermined rule; changing according to feedback information fed back to an opposite end or received from the opposite end; and changing according to received DCI signaling.

In an exemplary embodiment, in a case where the other transmission parameters are changed according to the predetermined rule, predetermined transmission parameters in each slot aggregation subgroup are the same or different. In the embodiment, in a case where the other transmission parameters are changed according to the predetermined or configured rule, transmission parameters may be predetermined or configured for different subgroups. Changing the DMRS density/pattern is a typical application. For different time-domain subgroups, time-domain or frequency-domain densities or patterns of DMRSs may be configured or predetermined to be different. Similarly, this manner may also be applied to density and pattern changing of an RS such as a CSI-RS and a PTRS. Similarly, this manner may further be extended to other parameters of the RS, such as the port number, the power, and the sequence.

In an exemplary embodiment, in a case where the other transmission parameters are changed according to the feedback information fed back to the opposite end or received from the opposite end, the feedback information is used for regulating transmission parameters of a next slot aggregation subgroup of the present slot aggregation subgroup. In the embodiment, the transmission parameters of the next slot aggregation subgroup may be changed according to feedback content. Changing the MCS or the beam is a typical application. A receiver may feed back a more appropriate MCS or beam information for transmission in subsequent slots, and the sender uses the preferred MCS and beam that are fed back from a predetermined subgroup after receiving the MCS or beam information. A validation time delay may be predetermined, or pre-configured through signaling. Besides the MCS and the beam, this manner may also be extended to some other transmission parameters, such as the resource allocation parameter, the power parameter, the DMRS density parameter, the DMRS port number, and the numerology parameter.

In some exemplary implementations, the transmission parameters of slot subgroups in slot aggregation may be determined relatively dynamically. For example, in a case where there is an enough time interval for feedback between subgroup x and subgroup y, the receiver may give a feedback to recommend transmission parameters of subgroup y after transmission of subgroup x is ended and before transmission of subgroup y is started.

In a case where the transmission parameters are changed through the feedback, some rules are required to be predetermined to eliminate exceptional feedbacks, and not every feedback is required to be used in transmission.

In an exemplary embodiment, in a case where the other transmission parameters are changed according to the received DCI signaling, the received DCI signaling includes complete DCI signaling and/or simplified DCI signaling, wherein each slot in a slot aggregation subgroup shares a piece of simplified DCI, and simplified DCI used for different slot aggregation subgroups is the same or different. In the embodiment, simplified control signaling may be sent to the slot aggregation subgroup in the slot aggregation process. It is mentioned above that only part of the whole transmission parameter set may be changed, so DCI signaling may be sent only for part of parameters that could be changed. In such a manner, a relatively low overhead is occupied, and a slot aggregation gain may still be obtained. In this manner, multiple aggregation subgroups may share the same piece of simplified DCI, and parameters of the DCI are used for slots in the subgroups, as shown in Table 1.

TABLE 1

| Aggregated slot set (sharing a complete DCI format) | | |
|---|---|---|
| Slot subgroup 1 (simplified DCI format may be sent) | Slot subgroup 2 (simplified DCI format may be sent) | Slot subgroup 3 (simplified DCI format may be sent) |
| Slot 1　　Slot 2 | Slot 3　　Slot 4 | Slot 5　　Slot 6 |

If there is simplified DCI, part of transmission parameters in the transmission parameters corresponding to the slot are determined according to complete DCI, and the other part of parameters are determined according to the simplified DCI, or the other part of parameters are determined according to both the simplified DCI and the complete DCI.

In an exemplary embodiment, for simple designing, multiple types of complete DCI signaling share one type of simplified DCI signaling, namely multiple complete DCI formats may share one type of simplified DCI format.

An embodiment provides a feedback information transmission method. FIG. 2 is a flowchart of a feedback information transmission method according to an embodiment of the disclosure. As shown in FIG. 2, the flow includes the following operations.

In S202, ACK/NACK information is fed back to an opposite side or received from the opposite end, wherein the ACK/NACK information is jointly transmitted with other feedback information, and the other feedback information is transmitted in a slot that is offset by a third threshold relative to a slot where the ACK/NACK information is transmitted.

In S204, at least one predetermined aggregated slot is regulated according to the ACK/NACK information that is fed back or received.

In S206, data is transmitted using the regulated aggregated slot.

The operations may be executed by a terminal.

In the embodiment of the disclosure, feedback of the ACK/NACK for slot aggregation transmission may be different from a common ACK/NACK. The common ACK/NACK may have only two states. For feeding back more information for slot aggregation transmission, the embodiments of the present disclosure propose an extension method to further subdivide the ACK/NACK into multiple states, namely the ACK/NACK may be jointly coded with multiple types of other feedback information.

In the embodiment, aggregated slots that are used are not fixed but can be flexibly regulated according to regulation instructions. That is, dynamic aggregated slots are used. Due to use of the dynamic aggregated slots, the transmission performance during data transmission can be improved effectively, the transmission efficiency can be improved, and the problems of low data transmission flexibility and low transmission efficiency caused by the fact that aggregated slots are fixed in the related art can be solved effectively.

In an exemplary embodiment, the other feedback information includes at least one of the following: information for indicating a present data transmission error; beam selection information; CSI; transmission parameter information; slot aggregation structure parameter; and indication information for indicating next ACK/NACK information reporting time.

For example, in a case where the other feedback information includes the information for indicating the present data transmission error, states of NACK+few errors, NACK+moderate number of errors, and NACK+many errors may be used for joint coding. Error mentioned herein is a noun, and the error may be represented in many manners, such as a Bit Error Rate (BER), a Block Error Rate (BLER), and a Signal to Noise Ratio (SINR). Joint coding may be as shown in Table 2.

TABLE 2

| Bit state | State meaning |
|---|---|
| 00 | ACK |
| 01 | NACK + few errors |
| 10 | NACK + moderate number of errors |
| 11 | NACK + many errors |

Besides the abovementioned three states used for quantizing errors, there may be more cases. For example, Ke SINR intervals, Ke BLER intervals, Ke BER intervals, etc., are used for representation. Ke is an integer more than or equal to 2.

For another example, the ACK/NACK may be jointly coded with the beam selection information or the CSI, as shown in Table 3:

TABLE 3

| Bit state | State meaning |
|---|---|
| 00 | ACK |
| 01 | NACK + Beam1 |
| 10 | NACK + Beam2 |
| 11 | NACK + Beam3 | or as shown in Table 4:

TABLE 4

| Bit state | State meaning |
|---|---|
| 00 | ACK |
| 01 | NACK + poor channel quality |
| 10 | NACK + common channel quality |
| 11 | NACK + high channel quality |

The ACK/NACK may also be jointly coded with the recommended transmission parameter, as shown in Table 5.

TABLE 5

| Bit state | State meaning |
|---|---|
| 00 | ACK |
| 01 | NACK + transmission parameter 1 |
| 10 | NACK + transmission parameter 2 |
| 11 | NACK + transmission parameter 3 |

In addition, there may be multiple types of transmission parameters, such as the MCS parameter, or the sending resource configuration parameter, including one or more of a time-domain resource, a frequency-domain resource, a space-domain resource (port, beam, etc.), and a power resource. The beam configuration parameter may be indicated by a QCL relationship.

The other feedback information may also be the slot aggregation structure parameter, etc, such as an aggregation structure for subsequent sending, the number of aggregated slots, the number of sub slot blocks, and an interval between the sub slot blocks, as shown in Table 6.

TABLE 6

| Bit state | State meaning |
|---|---|
| 00 | ACK |
| 01 | NACK + slot aggregation structure parameter 1 |
| 10 | NACK + slot aggregation structure parameter 2 |
| 11 | NACK + slot aggregation structure parameter 3 |

In some exemplary implementations, a gap with correct demodulation may be judged to select and recommend a subsequent sending structure. For example, in the above embodiments, the number of parameter 1 may be recommended by the terminal. The terminal may also give some recommendations about subsequent resource allocation of symbols or Resource Blocks (RBs). Alternatively, the terminal may only notify a base station of the size of the gap and perform quantization for feedback to the base station, and the base station finally determines specific processing.

In addition, the next ACK/NACK reporting time may also be indicated through the ACK/NACK (but it is to be noted that, besides the next ACK/NACK reporting time being indicated through the ACK/NACK, the other feedback information may also be used to indicate next corresponding feedback information reporting time), as shown in Table 7.

TABLE 7

| Bit state | State meaning |
|---|---|
| 00 | ACK |
| 01 | NACK + next ACK/NACK reporting time parameter 1 |
| 10 | NACK + next ACK/NACK reporting time parameter 2 |
| 11 | NACK + next ACK/NACK reporting time parameter 3 |

In the embodiment, the next ACK/NACK reporting time parameter may be represented by an offset value, and this offset value may be an offset relative to a present report, or a predetermined or configured offset relative to the ACK/NACK reporting position. Next ACK/NACK reporting may be advanced or delayed.

It is to be noted that the next ACK/NACK reporting time parameter shown in Table 7 may be replaced with a reporting time parameter of another type. In addition, the abovementioned multiple types of information jointly coded with the ACK/NACK may also be fed back independently under the triggering of the NACK. For example, the information may be fed back independently in a kx-th slot after the NACK is fed back.

In an exemplary embodiment, the operation that the ACK/NACK information is fed back to the opposite end includes at least one of the following operations.

For discrete slot aggregation, the operation of feeding back the ACK/NACK information to the opposite end is triggered in a case of switching between a slot for sending the data and a slot for sending other information except the data. In the embodiment, it may be predetermined that the feedback is triggered during I/O switching, namely ACK/NACK feedback and/or reporting of the abovementioned other feedback type are/is triggered when continuous slot aggregation is suspended and cannot be implemented completely continuously. For a slot aggregation format, a feedback count and/or corresponding slot positions in the slot aggregation process may be predetermined. Corresponding feedback triggering counts and/or positions may be predetermined or configured for different slot aggregation formats respectively.

The operation of feeding back the ACK/NACK information to the opposite end is triggered in a case where a transmission parameter is changed. For example, feedback may be triggered by switching of beams for transmission, changing of resource allocation for transmission, and changing of an MCS.

The operation of feeding back the ACK/NACK information to the opposite end is triggered in a case where a transmission quality exception of a previous slot is monitored. In the embodiment, the terminal may monitor the transmission quality of the previous slot, and trigger feedback actively when an exception is determined. For example, a feedback is given actively to notify this condition when it is determined that the transmission quality of the previous slot is quite poor. It is to be noted that, in this manner, a Physical Random Access Channel (PRACH) resource may be used for feedback. This manner may be used when a relatively large number of slots are aggregated.

In an exemplary embodiment, before the operation that the ACK/NACK information is fed back to the opposite end, the method further includes that: a feedback parameter corresponding to a determined slot aggregation format is predetermined, the feedback parameter including a feedback count and/or a corresponding slot position of feeding back the ACK/NACK information to the opposite end in a slot aggregation process, and different slot aggregation formats correspond to the same or different feedback parameters.

In an exemplary embodiment, the operation that the ACK/NACK information is fed back to the opposite end includes that: the ACK/NACK information is fed back to the opposite end according to a feedback interval, the feedback interval including an equal interval or unequal intervals. In the embodiment, ACK/NACK feedback may be implemented in an equal-interval-based uniform manner, or a non-uniform manner. Regardless of the uniform manner or the non-uniform manner, when waiting for an ACK/NACK, presence of 0 values may reduce resource waste because the probability of successful decoding tends to increase over time, namely resources sent from correct decoding to reception of the ACK by the base station are wasted. By this method, waste may be reduced.

In some exemplary implementations, in a case where the ACK/NACK information is fed back to the opposite end according to unequal intervals, the feedback interval for feeding back the ACK/NACK information to the opposite end decreases as slot aggregation transmission is implemented. That is, in the embodiment, the non-uniform manner may be used for feedback. For example, for the same type of feedback, feedback intervals decrease, or feedback granularities decrease over time as slot aggregation transmission is implemented.

In some exemplary implementations, before the ACK/NACK information is fed back to the opposite end according to the feedback interval, the method further includes that: the feedback interval is determined according to at least one of the following information: the number of slots having been transmitted (i.e., the number of slots having been transmitted by slot aggregation), and predetermined resource allocation information.

In an exemplary embodiment, the method further includes at least one of the following: the number of the at least one predetermined aggregated slot and an MCS are determined according to measured channel quality and pre-allocated in-slot resource information, and are reported; and the MCS is determined (namely an optimal MCS is determined) according to the measured channel quality and a given aggregated slot quantity, and is reported.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

An embodiment provides a data transmission device. The device is used to implement the above embodiments and exemplary implementations, and the details having been described will not be repeated. As used below, the term "module" may implement a combination of software and/or hardware of a predetermined function. Although the device described in the following embodiments is preferably implemented in software, the implementation in hardware or a combination of software and hardware is also possible and contemplated.

FIG. 3 is a structure block diagram of a data transmission device according to an embodiment of the disclosure. As shown in FIG. 3, the device includes:

a determination module 32, configured to determine a regulation instruction for regulating at least one predetermined aggregated slot; a first regulation module 34, configured to regulate the at least one predetermined aggregated slot according to the regulation instruction; and a first transmission module 36, configured to transmit data using the regulated aggregated slot.

In an exemplary embodiment, the regulation instruction includes at least one of the following: received first DCI signaling; feedback information fed back to an opposite end or received from the opposite end; an instruction triggered by modifying a scheduled resource position parameter; and an instruction triggered by modifying a TCI.

In an exemplary embodiment, in a case where the regulation instruction includes the first DCI signaling, the first regulation module 34 is configured to determine a slot where the first DCI signaling is received, use the slot as a first slot, and regulate ending time of the at least one predetermined aggregated slot to a second slot that is offset by a first threshold relative to the first slot.

In an exemplary embodiment, the device is further configured to, in a case where the regulation instruction includes the first DCI signaling, determine the slot where the first DCI signaling is received, use the slot as the first slot, and feed back ACK/NACK information in a third slot that is offset by a second threshold relative to the first slot.

In an exemplary embodiment, in a case where the regulation instruction includes the feedback information, the first regulation module 34 is configured to determine a slot, where the feedback information is fed back or received, as a fourth slot, and regulate ending time of the at least one predetermined aggregated slot to a fifth slot that is offset by a third threshold relative to the fourth slot.

In an exemplary embodiment, the feedback information includes at least one of the following: the ACK/NACK information; CSI; stopping request information requesting for stopping slot aggregation; beam recovery request information; transmission parameter change request information; and recommendation information for indicating a transmission format for transmission of the data.

In an exemplary embodiment, the at least one predetermined aggregated slot includes at least one or more slot aggregation subgroups. Part of transmission parameters in the at least one slot aggregation subgroup are fixed, and other transmission parameters are variable; and/or, part of transmission parameters in the at least one slot aggregation subgroup are general transmission parameters, and other transmission parameters are specific transmission parameters, wherein the general transmission parameters in all the slot aggregation subgroups in the at least one predetermined aggregated slot are the same, the specific transmission parameters are specific to each slot aggregation subgroup, and the specific transmission parameters used in each slot in a slot aggregation subgroup are the same.

In an exemplary embodiment, the other transmission parameters are changed according to at least one of the following manners: changing according to a predetermined rule; changing according to the feedback information fed back to the opposite end or received from the opposite end; and changing according to received DCI signaling.

In an exemplary embodiment, in a case where the other transmission parameters are changed according to the predetermined rule, predetermined transmission parameters in each slot aggregation subgroup are the same or different; and/or, in a case where the other transmission parameters are changed according to the feedback information fed back to the opposite end or received from the opposite end, the feedback information is used for regulating the transmission parameters of a next slot aggregation subgroup of a present slot aggregation subgroup; and/or, in a case where the other transmission parameters are changed according to the received DCI signaling, the received DCI signaling includes complete DCI signaling and/or simplified DCI signaling, each slot in a slot aggregation subgroup sharing a piece of simplified DCI, and simplified DCI used for different slot aggregation subgroups being the same or different.

In an exemplary embodiment, multiple types of complete DCI signaling share one type of simplified DCI signaling.

Figure 4:
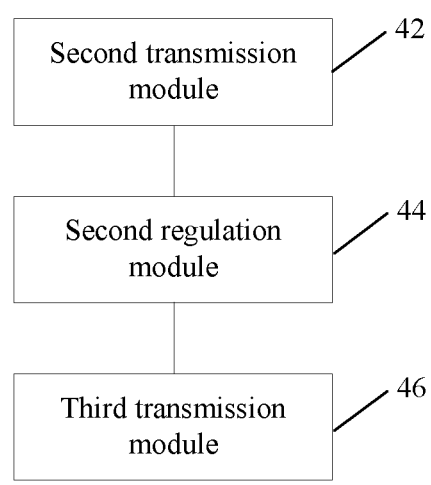
FIG. 4 is a structure block diagram of a data transmission device according to an embodiment of the disclosure.

FIG. 4 is a structure block diagram of a data transmission device according to an embodiment of the disclosure. As shown in FIG. 4, the device includes:

a second transmission module 42, configured to feed back, to an opposite end, or receive, from the opposite end, ACK/NACK information, wherein the ACK/NACK information is jointly transmitted with other feedback information, and the other feedback information is transmitted in a slot that is offset by a third threshold relative to a slot where the ACK/NACK information is transmitted; a second regulation module 44, configured to regulate at least one predetermined aggregated slot according to the ACK/NACK information that is fed back or received; and a third transmission module 46, configured to transmit data using the regulated aggregated slot.

In an exemplary embodiment, the other feedback information includes at least one of the following: information for indicating a present data transmission error; beam selection information; CSI; transmission parameter information; slot aggregation structure parameter; and indication information for indicating next ACK/NACK information reporting time.

In an exemplary embodiment, the second transmission module 42 may feed back the ACK/NACK information to the opposite end in at least one of the following manners: for discrete slot aggregation, triggering the operation of feeding back the ACK/NACK information to the opposite end in a case of switching between a slot for sending the data and a slot for sending other information except the data; triggering the operation of feeding back the ACK/NACK information to the opposite end in a case where a transmission parameter is changed; and triggering the operation of feeding back the ACK/NACK information to the opposite end in a case where a transmission quality exception of a previous slot is monitored.

In an exemplary embodiment, the device is further configured to, before feeding back the ACK/NACK information to the opposite end, predetermine a feedback parameter corresponding to a determined slot aggregation format, the feedback parameter including a feedback count of feeding back the ACK/NACK information to the opposite end in a slot aggregation process and/or a corresponding slot position, and different slot aggregation formats correspond to the same or different feedback parameters.

In an exemplary embodiment, the second transmission module 42 is configured to feed back the ACK/NACK information to the opposite end in the following manner: feeding back the ACK/NACK information to the opposite end according to a feedback interval, the feedback interval including an equal interval or unequal intervals.

In an exemplary embodiment, in a case where the ACK/NACK information is fed back to the opposite end according to unequal intervals, the feedback interval for feeding back the ACK/NACK information to the opposite end decreases as slot aggregation transmission is implemented.

In an exemplary embodiment, the device is further configured to, before feeding back the ACK/NACK information to the opposite end according to the feedback interval, determining the feedback interval according to at least one of the following information: the number of slots having been transmitted, and predetermined resource allocation information.

In an exemplary embodiment, the device is further configured to execute one of the following operations: determining, according to measured channel quality and pre-allocated in-slot resource information, and reporting the number of the at least one predetermined aggregated slot and an MCS; or determining, according to the measured channel quality and a given aggregated slot quantity, and reporting the MCS.

It is to be noted that each module may be implemented through software or hardware, and under the latter condition, may be implemented in, but not limited to, the following manner: the modules are all in the same processor, or the modules are in different processors in any combination form respectively.

An embodiment of the present disclosure provides a storage medium, in which a computer program is stored, the computer program being configured to execute the operations in any abovementioned method embodiment at runtime.

In some exemplary implementations, the storage medium may include, but is not limited to, various medium capable of storing computer programs such as a U disk, a ROM, a RAM, a mobile hard disk, a magnetic disk, or an optical disk.

An embodiment of the present disclosure provides an electronic device, which includes a memory and a processor. A computer program is stored in the memory. The processor is configured to run the computer program to execute the operations in any abovementioned method embodiment.

In some exemplary implementations, the electronic device may further include a transmission device and an input/output device. The transmission device is connected with the processor, and the input/output device is connected with the processor.

Specific examples in the embodiment may refer to the examples described in the abovementioned embodiments and exemplary implementations and will not be elaborated in the embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A data transmission method performed by a data transmission device, comprising:
   determining a regulation instruction for regulating at least one predetermined aggregated slot;
   regulating the at least one predetermined aggregated slot according to the regulation instruction; and
   transmitting data using the regulated aggregated slot;
   wherein the at least one predetermined aggregated slot comprises at least one slot aggregation subgroup, and the at least one slot aggregation subgroup satisfies the following:
   part of transmission parameters in the at least one slot aggregation subgroup are general transmission parameters, and transmission parameters, except the part of transmission parameters, in the at least one slot aggregation subgroup are specific transmission parameters, wherein the general transmission parameters in all slot aggregation subgroups in the at least one predetermined aggregated slot are the same. the specific transmission parameters are specific to each slot aggregation subgroup, and the specific transmission parameters used in all slots in one slot aggregation subgroup are the same.

2. The method according to claim 1, wherein the regulation instruction comprises at least one of the following:
   received first Downlink Control Information (DCI) signaling;
   feedback information fed back to an opposite end or feedback information received from the opposite end;
   an instruction triggered by modifying a scheduled resource position parameter; and
   an instruction triggered by modifying a Transmission Configuration Indicator (TCI).

3. The method according to claim 1, wherein the feedback information comprises at least one of the following:
   Acknowledgment (ACK)/Negative Acknowledgment (NACK) information;
   Channel State Information (CSI);
   stopping request information requesting for stopping slot aggregation;
   beam recovery request information;
   transmission parameter change request information; and
   recommendation information for indicating a transmission format for transmission of the data.

4. The method according to claim 1, wherein
   the at least one slot aggregation subgroup further satisfies the following:
   part of transmission parameters in the at least one slot aggregation subgroup are fixed, and transmission parameters, except the part of transmission parameters, in the at least one slot aggregation subgroup are variable.

5. The method according to claim 1, wherein the transmission parameters, except the part of transmission parameters, in the at least one slot aggregation subgroup, are changed according to at least one of the following manners:
   changing according to a predetermined rule;
   changing according to feedback information fed back to the opposite end or feedback information received from the opposite end; and
   changing according to received Downlink Control Information (DCI) signaling.

6. The method according to claim 5, wherein at least one of the following is satisfied:
   in a case where the transmission parameters, except the part of transmission parameters, in the at least one slot aggregation subgroup are changed according to the predetermined rule, predetermined transmission parameters in different slot aggregation subgroups of which transmission parameters are changed are the same or different;
   in a case where the transmission parameters, except the part of transmission parameters, in the at least one slot aggregation subgroup are changed according to the feedback information, the feedback information is used for regulating the transmission parameters of a next slot aggregation subgroup of a present slot aggregation subgroup; and
   in a case where the transmission parameters, except the part of transmission parameters, in the at least one slot aggregation subgroup are changed according to the received DCI signaling, the received DCI signaling comprises at least one of complete DCI signaling or simplified DCI signaling, all slots in one slot aggregation subgroup share a piece of simplified DCI, and simplified DCI used for different slot aggregation subgroups is the same or different.

7. The method according to claim 6, wherein multiple types of complete DCI signaling share one type of simplified DCI signaling.

8. A feedback information transmission method performed by a feedback information transmission device, comprising:
   feeding back, to an opposite end, or receiving, from the opposite end, Acknowledgment (ACK)/Negative Acknowledgment (NACK) information, wherein the ACK/NACK information is jointly transmitted with other feedback information, and the other feedback information is transmitted in a slot that is offset by a first threshold relative to a slot where the ACK/NACK information is transmitted;
   regulating at least one predetermined aggregated slot according to the ACK/NACK information; and
   transmitting data using the regulated aggregated slot.

9. The method according to claim 8, wherein the other feedback information comprises at least one of the following:
   information for indicating a present data transmission error;
   beam selection information;
   Channel State Information (CSI);
   transmission parameter information;
   slot aggregation structure parameter; and
   indication information for indicating next ACK/NACK information reporting time.

10. The method according to claim 8, wherein feeding back the ACK/NACK information to the opposite end comprises at least one of the following:
    for discrete slot aggregation, triggering an operation of feeding back the ACK/NACK information to the opposite end in a case of switching between a slot for sending the data and a slot for sending other information except the data;
    triggering the operation of feeding back the ACK/NACK information to the opposite end in a case where a transmission parameter is changed; and
    triggering the operation of feeding back the ACK/NACK information to the opposite end in a case where a transmission quality exception of a previous slot is monitored.

11. The method according to claim 8, before feeding back the ACK/NACK information to the opposite end, further comprising:
    predetermining a feedback parameter corresponding to a determined slot aggregation format, wherein the feedback parameter comprises at least one of the following: a feedback count and a corresponding slot position of feeding back the ACK/NACK information to the opposite end in a slot aggregation process, and different slot aggregation formats correspond to the same or different feedback parameters.

12. The method according to claim 8, wherein feeding back the ACK/NACK information to the opposite end comprises:
    feeding back the ACK/NACK information to the opposite end according to a feedback interval, wherein the feedback interval comprises an equal interval or unequal intervals.

13. The method according to claim 12, wherein in a case where the ACK/NACK information is fed back to the opposite end according to unequal intervals, the feedback interval for feeding back the ACK/NACK information to the opposite end decreases as slot aggregation transmission is implemented.

14. The method according to claim 12, before feeding back the ACK/NACK information to the opposite end according to the feedback interval, further comprising:
   determining the feedback interval according to at least one of the following information:
   the number of slots having been transmitted, and predetermined resource allocation information.

15. The method according to claim 8, further comprising one of the following:
   determining the number of the at least one predetermined aggregated slot and a Modulation and Coding Scheme (MCS) according to measured channel quality and pre-allocated in-slot resource information, and reporting the number and the MCS; or
   determining an MCS according to measured channel quality and a given aggregated slot quantity, and reporting the MCS.

16. A data transmission device, comprising a memory storing instructions and a processor in communication with the memory, wherein the processor is configured to execute the instructions to:
   determine a regulation instruction for regulating at least one predetermined aggregated slot;
   regulate the at least one predetermined aggregated slot according to the regulation instruction; and
   transmit data using the regulated aggregated slot;
   wherein the at least one predetermined aggregated slot comprises at least one slot aggregation subgroup, and the at least one slot aggregation subgroup satisfies the following:
   part of transmission parameters in the at least one slot aggregation subgroup are general transmission parameters, and transmission parameters, except the part of transmission parameters, in the at least one slot aggregation subgroup are specific transmission parameters, wherein the general transmission parameters in all slot aggregation subgroups in the at least one predetermined aggregated slot are the same. the specific transmission parameters are specific to each slot aggregation subgroup, and the specific transmission parameters used in all slots in one slot aggregation subgroup are the same.

17. A feedback information transmission device, comprising a memory storing instructions and a processor in communication with the memory, wherein the processor is configured to execute the instructions to perform the method according to claim 8.

18. The method according to claim 2, wherein in a case where the regulation instruction comprises the first DCI signaling, regulating the at least one predetermined aggregated slot according to the regulation instruction comprises:
   determining a slot where the first DCI signaling is received as a first slot; and
   regulating ending time of the at least one predetermined aggregated slot to a second slot that is offset by a first threshold relative to the first slot.

19. The method according to claim 2, wherein in a case where the regulation instruction comprises the first DCI signaling, the method further comprises:
   determining a slot where the first DCI signaling is received as a first slot; and
   feeding back Acknowledgment (ACK)/Negative Acknowledgment (NACK) information in a third slot that is offset by a second threshold relative to the first slot.

20. The method according to claim 2, wherein in a case where the regulation instruction comprises the feedback information, regulating the at least one predetermined aggregated slot according to the regulation instruction comprises:
   determining a slot where the feedback information is fed back or received as a fourth slot; and
   regulating ending time of the at least one predetermined aggregated slot to a fifth slot that is offset by a third threshold relative to the fourth slot.

* * * * *